United States Patent Office 3,151,733
Patented Oct. 6, 1964

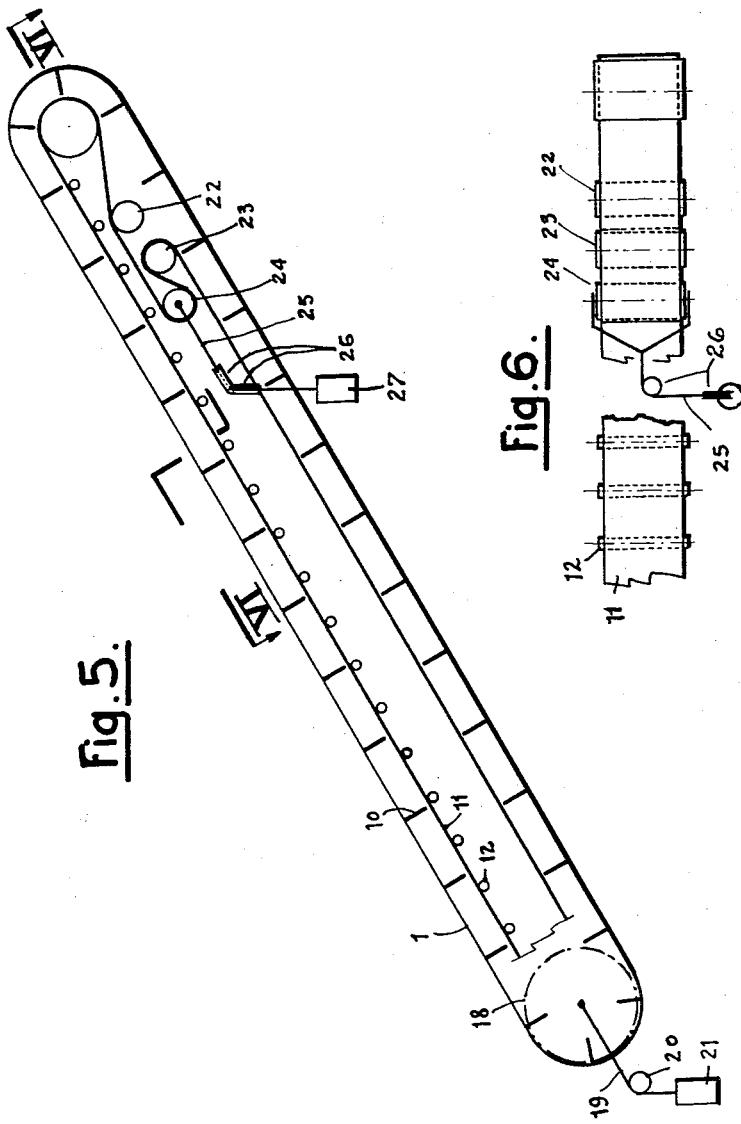
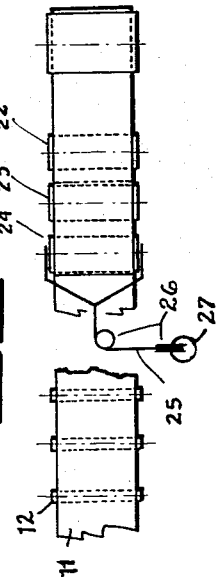

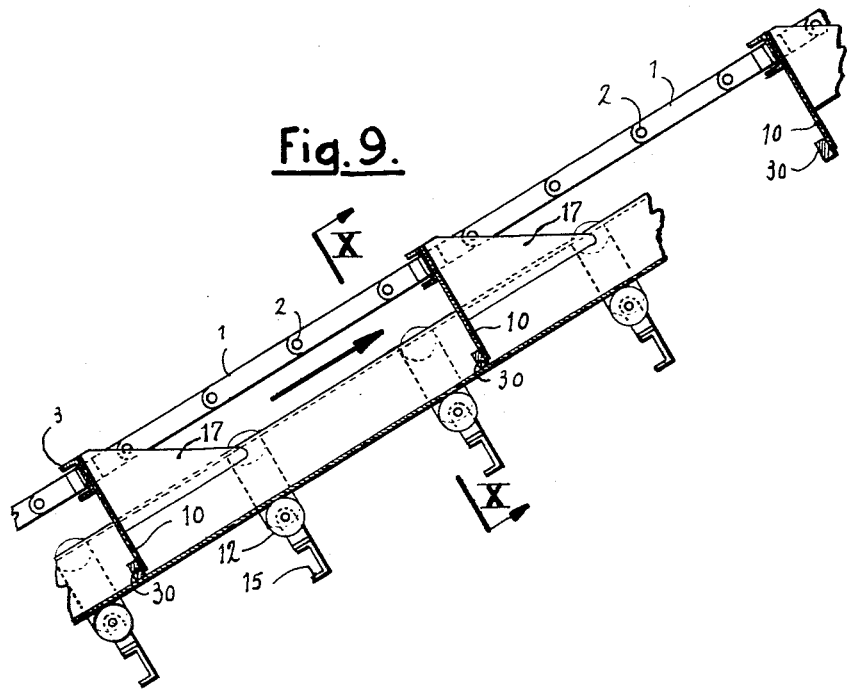
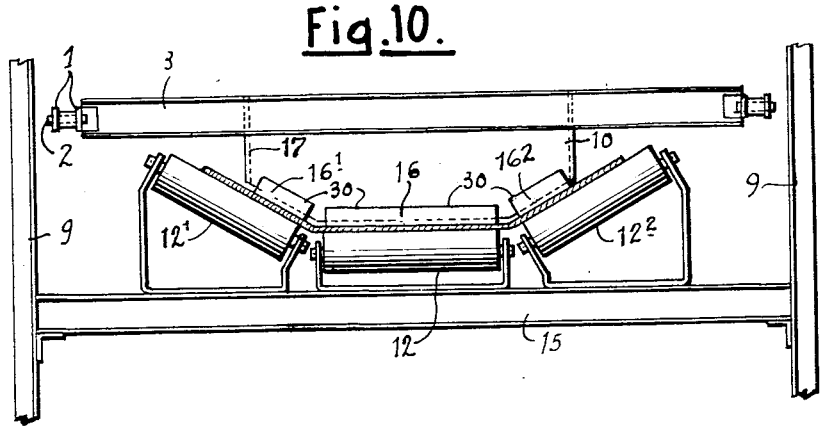

3,151,733
CONVEYING APPARATUS OF THE
CONTINUOUS TYPE
Wenceslas Emilie Louis Narcisse Coppee, 42 Rue Darwin,
Brussels, Belgium
Filed Sept. 7, 1961, Ser. No. 136,603
Claims priority, application Belgium, Sept. 9, 1960,
472,825, Patent 594,878; Apr. 6, 1961, 479,404, Patent
602,273
1 Claim. (Cl. 198—164)

The present invention relates to apparatus for conveying and elevating various products and in particular loose materials.

In mechanical handling it is known to use scraper drains for conveying various products.

Generally these scraper devices are formed by one or two chains, sometimes by cables, which drive scrapers, held in fixed channels, in which the materials to be conveyed are made to slide.

These devices have the disadvantage that they have poor efficiency because, to obtain movement of the materials, it is necessary to overcome the friction resistance of their mass on the base and walls of the channel, causing wear of the latter.

This disadvantage limits the use of scraper devices.

It is an object of the invention to overcome these disadvantages and comprises, principally, in combination a continuous conveyor provided with elements acting as pushers and a continuous belt or band, moving at substantially the same speed as the conveyor, the said pushers acting as driving members for material lying on the belt or band.

In a practical embodiment of the invention, use is made of a continuous plate conveyor the plates serving as pushers or driving members.

In a preferred embodiment, the plate conveyor can be formed as an assembly which rests by its weight on the belt or band causing the latter to move by the friction between the elements of the plate conveyor and the conveyor band on which it rests.

Figure 1:
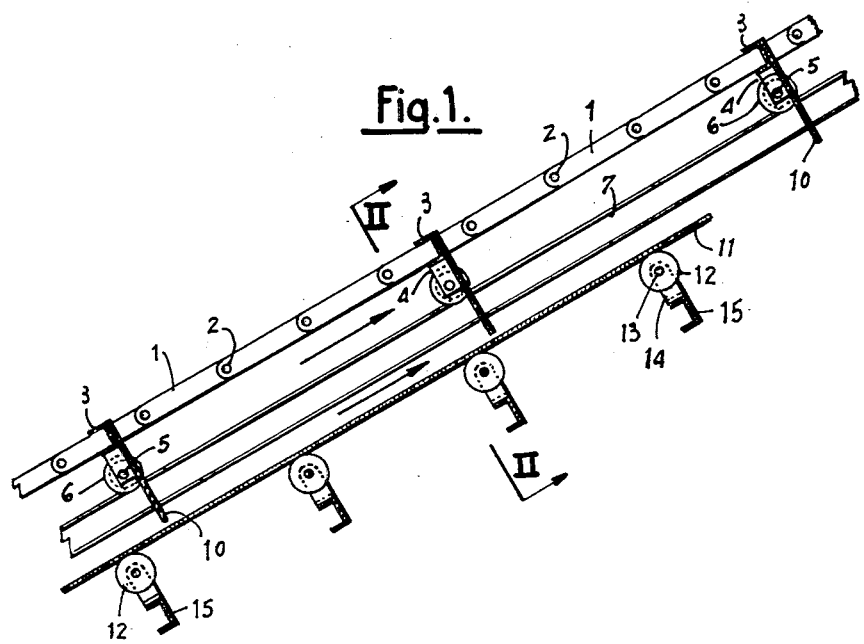
Figure 2:
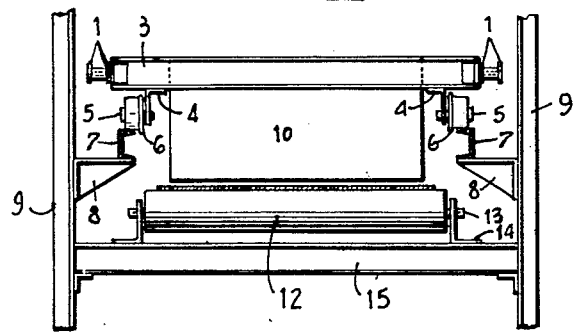
Figure 3:
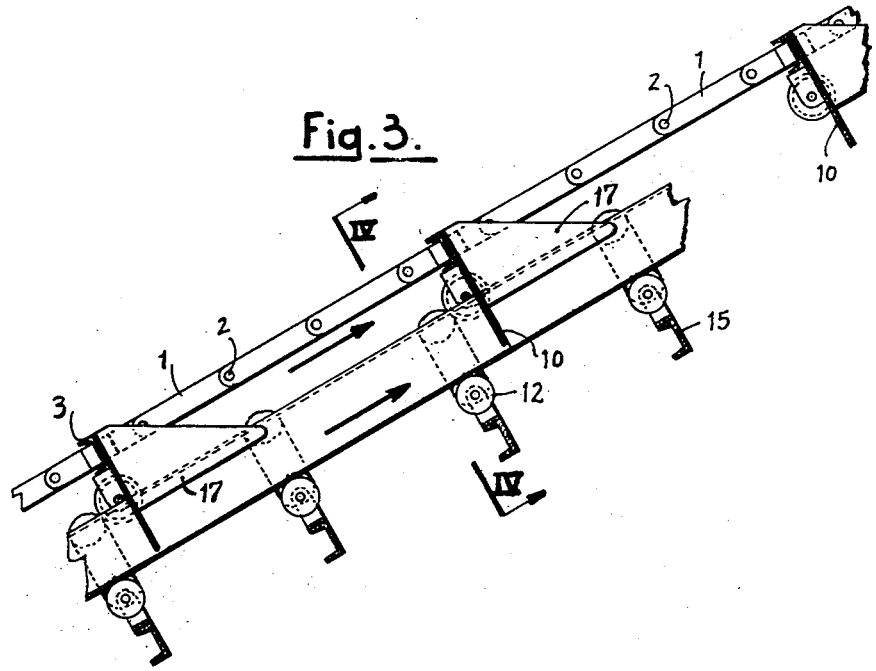
Figure 4:
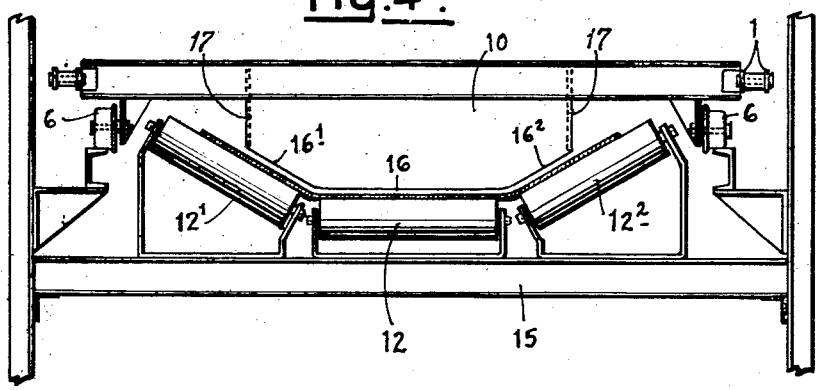
Figure 7:
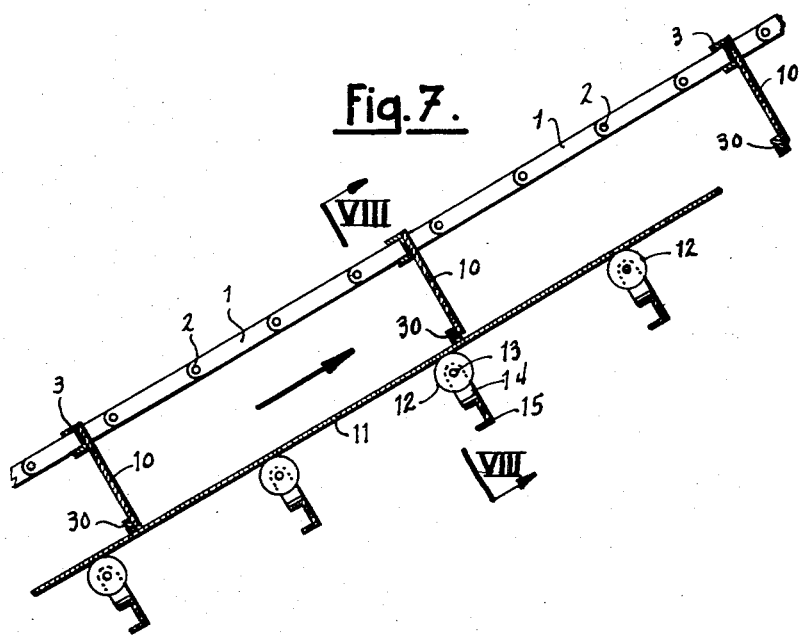
Figure 8:
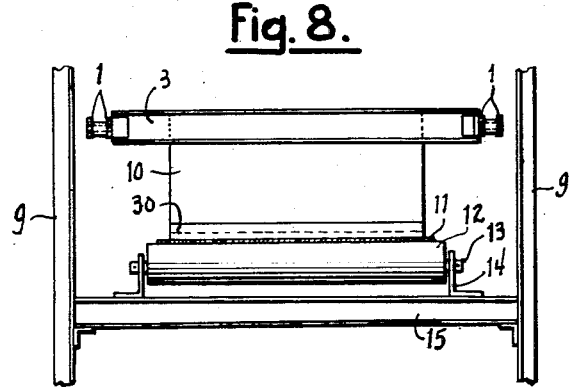

In order that the invention may be understood, there will be described two embodiments, being non limiting examples, reference being made to the drawings in which;

FIGURE 1 is a side elevation of one embodiment,
FIGURE 2 is a section on the line II—II of FIGURE 1,
FIGURE 3 is an elevation of a second embodiment, and
FIGURE 4 is a section on the line IV—IV of FIGURE 3.
FIGURE 5 is intended to show how the two conveyors can be independently tensioned,
FIGURE 6 is a section on the line VI—VI of FIGURE 5,
FIGURES 7 and 8 are views of an improvement corresponding to FIGURES 1 and 2,
FIGURES 9 and 10 show an improvement corresponding to FIGURES 3 and 4.

As can be seen from FIGURES 1 and 2, the conveyor comprises two parallel chains formed by links 1 coupled to each other by pivot pins 2 and which carry cross pieces 3 of U-shaped cross section.

On the lower arm of the cross pieces are secured adjacent each end, angle members 4 carrying pins 5 supporting rollers 6 running on rails 7 supported at intervals on bearer 8 rigid with structure 9.

The cross pieces support plates 10 which project toward a movable band 11 movable on rollers 12 whose axles are mounted on brackets 14 secured to cross members 15 which are integral with the frame structure 9.

In such a conveyor, scrapers as known in the art have been replaced by the plate 10 which are driven by one or more chains. These plates are similar to scrapers but act as pushers and not as scrapers.

Furthermore, the fixed channels in heretofore known arrangements have been replaced by conveyor bands 11 which may be likened to mobile channels and which in general are of a flexible material or are articulated.

According to the materials to be conveyed, they can be of steel, wood, rubber, etc.

An important feature is that the plates are moved at a speed approximately the same as that of the conveyor band.

In these conditions, the materials to be conveyed and elevated do not slide in a fixed channel, but are carried by a mobile element.

This results in passive resistance and reduced wear since friction has been virtually eliminated.

In the embodiment of FIGURES 3 and 4 the lower edge of the plates 10 is formed by a straight edge 16 positioned between inclined edge $16^1$ and 16. Side panels 17 are rigidly connected to the plates, and are of triangular shape.

The band conveyor 11 has a profile corresponding to that of the lower edge of the plates and moves on gangs of rollers each comprising a horizonal roller 12 and two inclined side rollers $12^1$–$12^2$.

The chains and bands are driven by known mechanical arrangements.

However it is essential in order to ensure good functioning and long life of the chains and bands, that they cannot strain one another, and it is for this reason that it is necessary to provide independent tension arrangements for the chains and for the bands.

As an example, such an independent arrangement is shown in FIGURES 5 and 6.

In FIGURE 5 there is shown at 18 a sprocket about which chains 1 move. To this sprocket is secured a cable 19 passing over a guide roller 20 and carrying weights 21. The band 11 passes in zig-zag fashion about drums 22–23–24. A cable 25 is secured to drum 24 and passes around pulleys 26 and carries weights 27.

The advantages of such a conveyor are that it associates and combines the virtues of band conveyors and scraper conveyors while eliminating their disadvantages.

Band conveyors are effective for long distances but their elevating power is limited to an inclination which does not exceed 20 to 22° for materials such as coal and 16 to 17° for earth mixed with stones, while scraper conveyors can operate over short distances only to lift various objects vertically.

Plate elevator conveyors are then, as their name indicates, not only conveyors but above all continuous elevators.

It is clear that the chains may be replaced by cables.

According to an improvement as shown in FIGS. 7 and 8, the supports 4 and 5, the rollers 6 and the rails 7 can be omitted. In the case of the latter improvement the plates 10, the cross pieces 3 and the chains formed of links 1 coupled by their pins 2 constitute an assembly which rests by its own weight on the band 11.

The result of this is that the total weight of the cross pieces 3, plates 10 and chains exert an adhering force A on the band 11.

If E is the force necessary to move the band 11 and its supports (the rollers 12, $12^1$, $12^2$, the drums 22, 23, 24 as well as those for the return run of band 11), and if the force A exerted on the band 11 is greater than E, then the band 11 will be moved with the assembly by the friction between the plates 10 and the band 11.

From what has just been shown it follows that band 11 and its supports will be moved by the friction between the assembly and the belt 11 when the chains drive the plates 10. It is to be noted that the friction (adhering force A)

will increase in proportion to an increase of the load on the apparatus.

If it is necessary to increase adherence between the driving means and the support band, the edges of the plates in contact with the band may be provided with rubber or any other material having a high coefficient of friction with the band. The necessary synchronism of movement of the driving elements and of the supporting band is obtained automatically without the upper and lower drums of the band being driven other than by adherence as described above. The upper and lower drums of the band can turn freely on their axis.

The omission of the parts 4, 5, 6 and 7 provides an arrangement for giving a synchronised movement to the driving apparatus for the plates and the band.

In FIGURES 7 and 8 the band 11 is driven by friction between plates 10 and the band 11.

At 30 are shown bands having rubber or other material of a high coefficient of friction with band 11.

In the embodiment shown in FIGURES 9 and 10 the lower edge of the plates 10 have, as in FIGURES 3 and 4 on either side of a straight edge 16, inclined edges $16^1$ and $16^2$ with which side panels 17 are rigidly connected.

The band 11 of corresponding profile moves on gangs of rollers each comprising a horizontal roller 12 and two inclined rollers $12^1$–$12^2$ to each side of roller 12.

In the case of FIGURES 7 to 10, since the movements of the conveyor can be produced by a single control, all driving force for the bands 11 is eliminated.

What I claim is:

A conveyor installation comprising an inclined belt conveyor, a second conveyor lying above the first conveyor in inclined parallel relationship, freely rotatable rollers supporting the belt conveyor, means for driving said second conveyor in an upward direction, said second conveyor being constituted by a pair of spaced chains extending parallel to the belt conveyors and including links, pins coupling said links together, cross pieces supported by some of the said pins, and plates supported on said cross pieces extending towards said belt conveyor and cooperating with the latter to define conveyor compartments and constituting driving means for material lying on the belt conveyor, the chains, cross pieces and members constituting an assembly resting by its own weight on the belt conveyor to provide a frictional force between said belt conveyor and the assembly sufficient to cause driving of the belt conveyor as said assembly is driven.

References Cited in the file of this patent

UNITED STATES PATENTS

| | | |
|---|---|---|
| 1,251,478 | Cowley | Jan. 1, 1918 |
| 1,536,331 | Conant | May 5, 1925 |
| 1,643,786 | Peale | Sept. 27, 1927 |
| 1,786,779 | Quick | Dec. 30, 1930 |
| 2,546,512 | Lewis | Mar. 27, 1951 |
| 2,551,840 | Johansen | May 8, 1951 |
| 2,573,486 | Pollitz | Oct. 30, 1951 |
| 2,796,970 | Borrowdale | June 25, 1957 |
| 2,966,254 | Kaiser | Dec. 27, 1960 |

FOREIGN PATENTS

| | | |
|---|---|---|
| 502,512 | Germany | July 14, 1930 |
| 591,080 | Great Britain | Aug. 6, 1947 |

OTHER REFERENCES

Brochure from Dura-Belting Company, Inc., received in the Patent Office March 17, 1959.